UNITED STATES PATENT OFFICE.

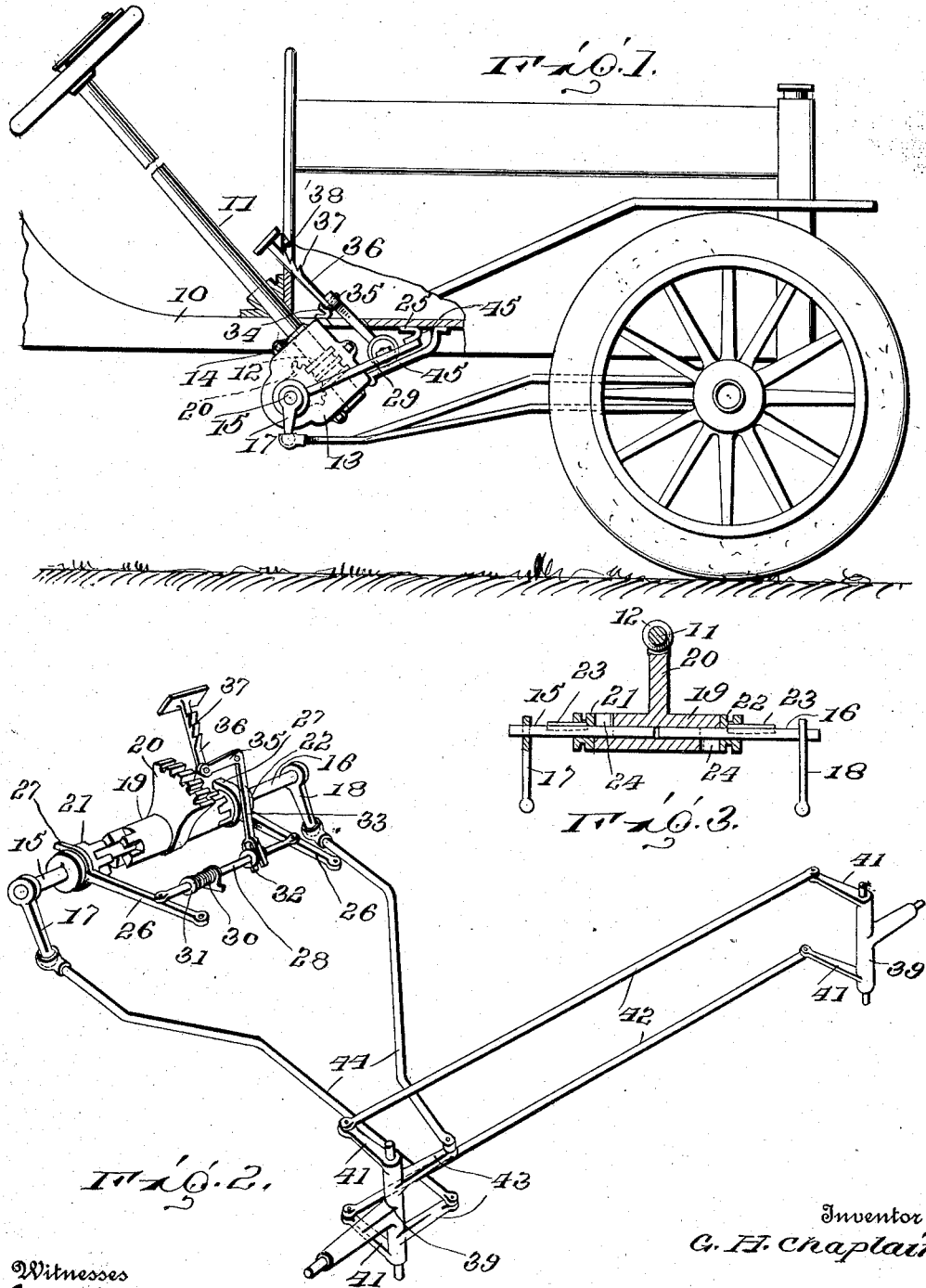

GEORGE H. CHAPLAIN, OF LEAVENWORTH, KANSAS.

STEERING-GEAR.

1,015,295.  Specification of Letters Patent.  Patented Jan. 23, 1912.

Application filed February 2, 1911. Serial No. 606,271.

*To all whom it may concern:*

Be it known that I, GEORGE H. CHAPLAIN, a citizen of the United States, residing at Leavenworth, in the county of Leavenworth and State of Kansas, have invented certain new and useful Improvements in Steering-Gear, of which the following is a specification.

This invention relates to motor vehicles, and refers to an improved steering gear to be used in connection with the motor vehicles, and has for an object to provide a safety attachment to the gear for use in case of breakage to the usual steering gear.

The invention has for another object to provide a motor vehicle with an improved steering gear which is of duplicate form and which has attached thereto a foot-lever for throwing the duplicate steering mechanisms alternately in and out of operation with the steering post.

For a full understanding of the invention reference is to be had to the following description and accompanying drawing, in which:—

Figure 1 is a side elevation of the forward end of a motor vehicle having the improved steering mechanism applied thereto, the same being disclosed partly in section. Fig. 2 is a detail perspective view of the steering mechanism, and Fig. 3 is a sectional view through the quadrant and the clutch-sleeves.

Corresponding and like parts are referred to in the following description and indicated in all the views of the accompanying drawing by the same reference characters.

Referring to the drawings the reference numeral 10 designates the body-frame of a motor vehicle which is provided in the usual manner with a steering post 11 carrying a fixed worm-gear 12. A housing 13 incases the lower end of the steering post 11 and the gear 12, and is hung beneath the frame 10 upon suitable hangers 14. The housing 13 is provided in its lower portion with a pair of shafts 15 and 16 which are arranged in longitudinal alinement with one another and are journaled adjacent to their central portions through the sides of the housing 13. The outer extremities of the shafts 15 and 16 carry depending arms 17 and 18 to which are attached the duplicate steering mechanisms. The inner ends of the shafts 15 and 16 are spaced slightly apart so as to admit of the uninterrupted action of the same and carry thereabout the elongated hub 19 of a quadrant 20. The quadrant 20 is provided with a worm-rack in its periphery intermeshing with the worm-gear 12. Sleeves 21 and 22 are slidably disposed upon the shafts 15 and 16, respectively, and are held from rotation thereon by keys 23. The adjacent ends of the hub 19 and the sleeves 21 and 22 are provided with interlocking teeth 24 for the purpose of alternately connecting the shafts 15 and 16 with the segment 20.

The frame 10 is provided with a transverse angle iron 25 secured across its under side and having the depending flange of the same bent backwardly at an acute angle. Clutch levers 26 are hinged upon the opposite ends of the angle iron 25 and extend diagonally down within the sides of the housing 13 and are hingedly attached to the clutch sleeves 21 and 22 by bands 27 seating in annular grooves or depressions formed in the peripheries of the clutch sleeves. The clutch levers 26 are connected to one another by a rod 28 having its ends pivoted to the clutch levers 26 midway of their ends so as to move the same in parallelism to alternately interlock and release the clutch-sleeves 21 and 22 with the hub 19. A spring-box 29 is carried upon a brace 45 beneath the frame 10 through which is longitudinally passed the connecting rod 28. The box 29 is preferably of cylindrical form and contains a helical spring 30 having one end thereof bearing against a fixed washer 31 carried upon the connecting rod 28. The spring 30 is of sufficient tension to throw the connecting rod through the box 29 and hold the clutch member 21 normally in engagement with the hub 19.

A connecting sleeve 32 is carried in fixed relation upon the connecting rod 28 in spaced relation from the box 29 and is provided with an annular groove receiving the forked arm 33 of a bell-crank lever which is pivoted upon a support 34 depending from the frame. It will be noted from Fig. 2 that the bell-crank lever upon the support 34 is arranged directly over the connecting sleeve 32 and that the upper arm 35 thereof extends horizontally beneath the frame 10 and is pivotally connected to the lower extremity of a foot lever 36 which is carried through the frame 10. The lever 36 is formed with teeth 37 engaging beneath the lip 38 carried by the frame 10 when the lever 36 is depressed.

The steering mechanism which is connected to the arms 17 and 18 is of the usual form, the same comprising the steering knuckles 39. The steering knuckles 39 carry vertically spaced arms 41 which are connected by a pair of cross-rods 42 to intercommunicate motion between the steering knuckles 39. A pair of connecting arms 43 project from one of the knuckles 39 inwardly to hingedly support the forward ends of the connecting rods 44. The rear ends of the rods 44 are hingedly attached to the lower ends of the arms 18 and 19. With this arrangement when one of the steering cross-arms, or its adjacent members break or become inoperative, the operator can withdraw the steering gear and throw the opposite steering arm and its adjacent members into connection with the knuckles.

As is disclosed in Fig. 2 of the drawing the steering mechanism connected to the depending arm 18 is normally in operation. The spring 30 within the box 29 draws the clutch levers 26 over to throw the clutch sleeve 22 against the adjacent end of the hub 19, interlocking the teeth 24. The swinging movement imparted to the segment 20 is thereby communicated to the arm 18. Should the operating mechanism connected to the arm 18 break, the operator quickly depresses the foot lever 36 to swing the bell crank lever and move the forked arm 33 to draw the rod 28 through the box 29, compressing the spring 30. As the foot lever 36 is moved down the inclined teeth 37 slide loosely over the edge of the plate 38 until the downward movement of the lever 36 is stopped when the operator springs the lever 36 up and engages the shoulder of the adjacent tooth 37 against the plate 38 to lock the clutches in position. The tension of the spring 30, acting through the rod 28 and arms 33 and 35, yieldingly holds the lever 36 in engagement with the plate 38. In depressing the foot lever 36 the clutch levers 26 slide the clutch sleeve 21 into engagement with the adjacent end of the hub 19, while at the same time the clutch levers 26 withdraw the clutch sleeve 22 from the opposite end of the hub 19. As the clutch sleeve 21 is keyed upon the shaft 15, the arm 17 is now brought into action to operate the opposite steering mechanism connected thereto.

Having thus described the invention what is claimed as new is:—

1. A steering gear including a quadrant having an elongated hub, independent shafts journaled in the ends of the hub, clutch-members carried upon the shafts for alternate interlocking engagement with the hub, holding means connected to the clutch-members for interlocking one of the same normally with the hub, and a lever connected to the clutches for alternating the interlocking of the clutches.

2. Steering gear including independent steering mechanisms, shafts independently connected to the steering mechanisms, a single steering post, a quadrant connected for operation to the steering post, and clutches between the shafts and the quadrant for alternately interlocking the shafts thereto.

3. A steering gear including a pair of independent steering mechanisms, shafts connected to the mechanisms, clutches keyed upon the shafts for longitudinal sliding movement, an operating quadrant arranged between the shafts and having clutch teeth at its opposite ends, a spring connected to the clutch-sleeves for normally holding one of the same in engagement with the quadrant, and an operating lever connected to the clutch-sleeves for effecting the alternate interlocking engagement of the clutch-sleeves with the quadrant.

4. A steering gear including separate steering mechanisms, a quadrant arranged between the shafts for interlocking engagement with the quadrant, operating members connected to the clutch-sleeves for holding the same for alternate interlocking engagement with the quadrant, a spring connected to the operating members for holding the same in one position, and a lever communicating with the operating members for changing the position of the same.

5. A steering gear including a hub, means for rotating the hub, clutch members carried at the ends of the hub, one of which is adapted for normal interlocking engagement with the hub, steering mechanisms connected independently to the clutches, holding means having connection to the clutch members for interlocking one of the same with the hub, and a lever connected to the clutches for alternating the interlocking of the same.

In testimony whereof, I affix my signature in presence of two witnesses.

GEORGE H. CHAPLAIN. [L. S.]

Witnesses:
J. A. GATES,
FRANK STODDARD.

Copies of this patent may be obtained for five cents each, by addressing the "Commissioner of Patents, Washington, D. C."